United States Patent
Jang et al.

(10) Patent No.: US 12,548,308 B2
(45) Date of Patent: Feb. 10, 2026

(54) METHOD AND SYSTEM FOR FUSING DATA FROM LiDAR AND CAMERA

(71) Applicants: HYUNDAI MOTOR COMPANY, Seoul (KR); Kia Corporation, Seoul (KR); Konkuk University Industrial Cooperation Corp, Seoul (KR)

(72) Inventors: Sung Moon Jang, Seongnam-si (KR); Ki Chun Jo, Seoul (KR); Jin Su Ha, Seoul (KR); Ha Min Song, Yeosu-si (KR); Chan Soo Kim, Seoul (KR); Ji Eun Cho, Seoul (KR)

(73) Assignees: Hyundai Motor Company, Seoul (KR); Kia Corporation, Seoul (KR); Konkuk University Industrial Cooperation Corp., Seoul (KR)

( * ) Notice: Subject to any disclaimer, the term of this patent is extended or adjusted under 35 U.S.C. 154(b) by 272 days.

(21) Appl. No.: 18/511,031

(22) Filed: Nov. 16, 2023

(65) Prior Publication Data
US 2024/0161481 A1   May 16, 2024

(30) Foreign Application Priority Data
Nov. 16, 2022 (KR) .......... 10-2022-0153274

(51) Int. Cl.
| | |
|---|---|
| G06V 10/80 | (2022.01) |
| G01S 17/86 | (2020.01) |
| G06V 10/40 | (2022.01) |
| G06V 10/77 | (2022.01) |
| G06V 10/82 | (2022.01) |
| G06V 20/58 | (2022.01) |
| G06V 20/70 | (2022.01) |

(52) U.S. Cl.
CPC ............ *G06V 10/806* (2022.01); *G06V 10/40* (2022.01); *G06V 10/7715* (2022.01); *G06V 10/82* (2022.01); *G06V 20/58* (2022.01); *G06V 20/70* (2022.01)

(58) Field of Classification Search
USPC .......................................... 382/103, 104, 284
See application file for complete search history.

(56) References Cited

U.S. PATENT DOCUMENTS

| | | | | |
|---|---|---|---|---|
| 10,509,413 | B2 * | 12/2019 | Mou ....................... | G01S 17/86 |
| 12,339,405 | B1 * | 6/2025 | Yuan ........................ | G06T 7/70 |
| 2019/0311546 | A1 * | 10/2019 | Tay ......................... | G06T 7/521 |

(Continued)

OTHER PUBLICATIONS

Chen et al., RolFusion: 3D Object Detection From LiDAR and Vision, IEEE Access, vol. 9, 2021, pp. 51710-51721. (Year: 2021).*

(Continued)

*Primary Examiner* — Ishrat I Sherali
(74) *Attorney, Agent, or Firm* — Morgan Lewis & Bockius LLP (57) ABSTRACT

A LiDAR and camera data fusion method includes generating a voxel-wise feature map based on point cloud data of a LiDAR sensor, generating a pixel-wise feature map based on image data of a camera, converting three-dimensional (3D) coordinates of point data of the voxel-wise feature map to two-dimensional (2D) coordinates, based on at least one predefined calibration parameter, and generating fused data by combining pixel data of the pixel-wise feature map and point data of the 2D coordinates.

19 Claims, 8 Drawing Sheets

(56) References Cited

U.S. PATENT DOCUMENTS

| | | | |
|---|---|---|---|
| 2021/0026355 A1* | 1/2021 | Chen | G01S 17/89 |
| 2021/0082148 A1* | 3/2021 | Parkison | G01S 7/40 |
| 2022/0358328 A1* | 11/2022 | Wu | G06N 3/045 |
| 2024/0070541 A1* | 2/2024 | Borse | G06N 20/00 |
| 2024/0087222 A1* | 3/2024 | Li | G06V 10/44 |
| 2024/0112035 A1* | 4/2024 | You | G06V 10/454 |
| 2024/0212374 A1* | 6/2024 | Li | G06V 20/56 |

OTHER PUBLICATIONS

VPFNet: Voxel-Pixel Fusion Network for Multi 3D Object Detection, arXiv:2111.00966v1 [cs.CV], pp. 1-7. (Year: 2021).*

* cited by examiner

| Single camera | |
|---|---|
| Class | IoU |
| PTW | 71.7% |
| Pedestrian | 70.7% |
| Commercial vehicle | 81.3% |
| Passenger car | 86.0% |
| Cyclist | 63.3% |
| mIoU | 74.6% |

FIG. 8A

| Single lidar | |
|---|---|
| Class | IoU |
| PTW | 63.4% |
| Pedestrian | 74.8% |
| Commercial vehicle | 84.6% |
| Passenger car | 90.3% |
| Cyclist | 49.3% |
| mIoU | 72.5% |

FIG. 8B

| Camera + LiDAR | |
|---|---|
| Class | IoU |
| PTW | 80.3% (↑) |
| Pedestrian | 83.3% (↑) |
| Commercial vehicle | 91.0% (↑) |
| Passenger car | 93.8% (↑) |
| Cyclist | 67.1% (↑) |
| mIoU | 83.2% |

FIG. 8C

METHOD AND SYSTEM FOR FUSING DATA FROM LiDAR AND CAMERA

CROSS-REFERENCE TO RELATED APPLICATION

The present application claims priority to Korean Patent Application No. 10-2022-0153274, filed on Nov. 16, 2022, the entire contents of which is incorporated herein for all purposes by this reference.

BACKGROUND OF THE PRESENT DISCLOSURE

Field of the Present Disclosure

The present disclosure relates to a method and system for fusing data from a Light Detection and Ranging (LiDAR) and a camera.

Description of Related art

Traditionally, LiDAR-based point cloud semantic segmentation for a vehicle has its limitations in performance in object recognition.

For example, there has been a problem that the greater the distance between a LiDAR and an object, the greater the spacing between beams of the LiDAR, reducing the number of points representing the object. This problem may be exacerbated as the distance between the LiDAR and the object increases and/or the size of the object decreases.

Furthermore, a point cloud obtained via the LiDAR may not provide color information effective for classification.

To improve this, a point cloud semantic segmentation technique based on camera and LiDAR fusion of a middle-level feature fusion structure has been developed by applying a two-dimensional (2D) point cloud network.

The 2D point cloud network may be a technique for representing a three-dimensional (3D) point cloud as 2D data and using it as an input to a deep learning network.

The point cloud semantic segmentation technique based on camera and LiDAR fusion of the middle-level feature fusion structure may require fusing feature maps extracted from encoders respectively applied to the LiDAR and the camera.

Traditionally, it has been challenging to accurately match point cloud data of the LiDAR converted to 2D and 2D image data of the camera in a process of fusing the feature maps extracted from the encoders respectively applied to the LiDAR and the camera.

Figure 1:
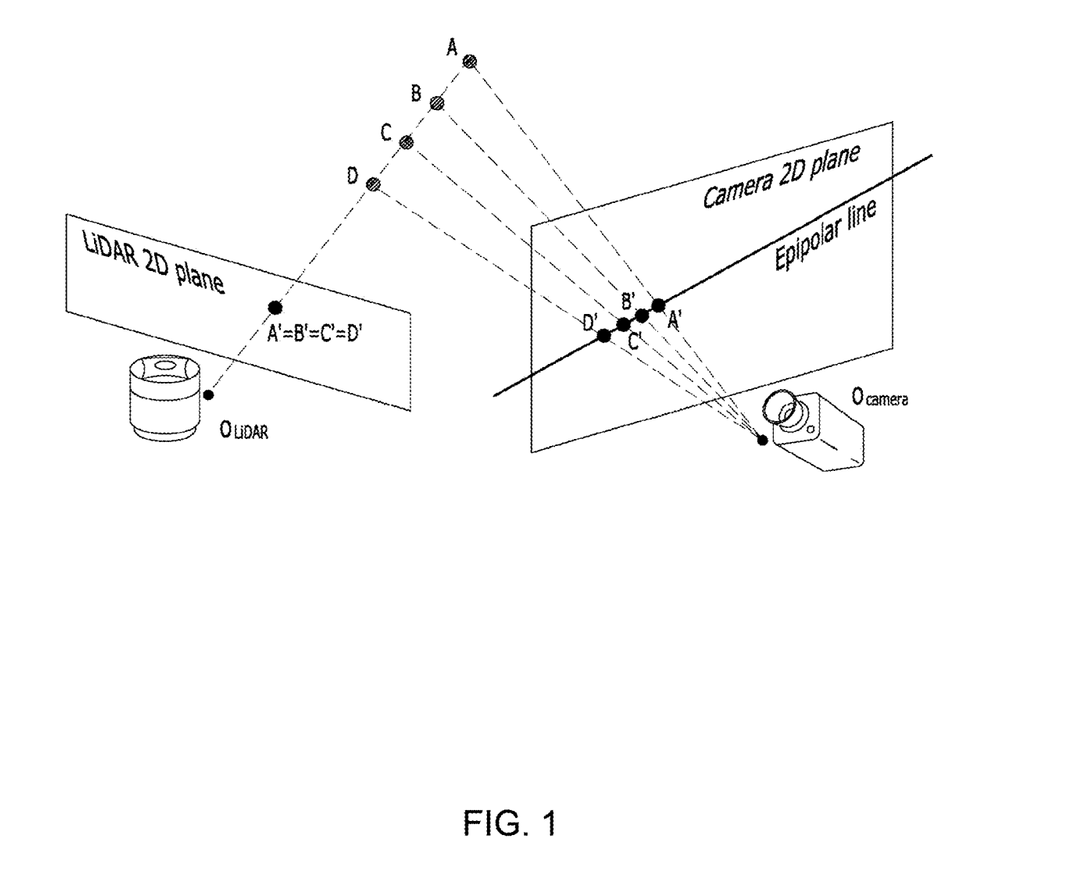
FIG. 1 is a diagram illustrating a result of matching point cloud data and image data according to the related art.

FIG. 1 is a diagram illustrating a result of matching point cloud data and image data according to the related art.

Referring to FIG. 1, when points of different objects (e.g., A, B, C, and D) are projected onto a 2D plane of a LiDAR and a 2D plane of a camera, each of the objects (A, B, C, and D) may not be matched one to one (1:1, or point:point) on the respective 2D planes of the LiDAR and the camera but be matched one to N (1:N, or one:line).

The information included in this Background of the present disclosure is only for enhancement of understanding of the general background of the present disclosure and may not be taken as an acknowledgement or any form of suggestion that this information forms the prior art already known to a person skilled in the art.

BRIEF SUMMARY OF THE PRESENT DISCLOSURE

Various aspects of the present disclosure are directed to providing a LiDAR and camera data fusion method and system which may semantically segment a point cloud representing an object around a vehicle by solving a conventional difficulty in data matching when fusing data from a LiDAR sensor and a camera of the vehicle via a middle-level feature fusion structure-based network.

Also, various aspects of the present disclosure are directed to providing a LiDAR and camera data fusion method and system which may accurately match features extracted from a LiDAR and a camera of a vehicle.

For example, the LiDAR and camera data fusion method and system of the present disclosure may apply voxel and pixel matching-based fusion to improve the performance of semantic segmentation of a point cloud, compared to using a single sensor of the vehicle.

According to an exemplary embodiment of the present disclosure, a LiDAR and camera data fusion method includes generating a voxel-wise feature map based on point cloud data of a LiDAR sensor, generating a pixel-wise feature map based on image data of a camera, converting three-dimensional (3D) coordinates of point data of the voxel-wise feature map to two-dimensional (2D) coordinates, based on at least one predefined calibration parameter, and generating fused data by combining pixel data of the pixel-wise feature map and point data of the 2D coordinates.

In at least an exemplary embodiment of the present disclosure, the voxel-wise feature map is generated via a 3D voxel-based neural network.

In at least an exemplary embodiment of the present disclosure, the pixel-wise feature map is generated via a neural network.

In at least an exemplary embodiment of the present disclosure, the at least one predefined calibration parameter includes an angle difference and a separation distance between the LiDAR and the camera on the vehicle.

In at least an exemplary embodiment of the present disclosure, the method further includes determining, on the pixel-wise feature map, a pixel corresponding to each of the point data of the 2D coordinates, sampling, in the pixel-wise feature map, pixels in an area of a predetermined size including the pixel corresponding to each of the point data, and generating a pixel feature vector representative of the sampled pixels through max pooling.

In at least an exemplary embodiment of the present disclosure, the generating of fused data includes generating a fused feature vector via a convolutional layer, after combining a voxel feature vector of the point data and the pixel feature vector.

In at least an exemplary embodiment of the present disclosure, the method further includes extracting the voxel feature vector of the point data by randomly selecting the point data included in voxels of the voxel-wise feature map.

In at least an exemplary embodiment of the present disclosure, the generating of the fused feature vector via the convolutional layer includes applying a convolution operation to the voxel feature vector of the point data and the fused feature vector, applying a batch normalization operation to a result of the convolution operation, and applying a rectified linear unit (ReLU) operation to a result of the batch normalization operation to generate the fused feature vector.

In at least an exemplary embodiment of the present disclosure, the method further includes updating and outputting the voxel-wise feature map based on the fused data.

A LiDAR and camera data fusion system, according to an exemplary embodiment of the present disclosure, includes an interface configured to receive point cloud data from a LiDAR sensor and image data from a camera, a memory configured to store at least one predefined calibration parameter, and a processor electrically or communicatively connected to the interface and the memory, wherein the processor is configured to generate a voxel-wise feature map based on the point cloud data, generate a pixel-wise feature map based on the image data, convert three-dimensional (3D) coordinates of point data of the voxel-wise feature map to two-dimensional (2D) coordinates, based on the at least one predefined calibration parameter, and generate fused data by fusing pixel data of the pixel-wise feature map and the point data of the 2D coordinates.

In at least an exemplary embodiment of the system, the voxel-wise feature map is generated via a 3D voxel-based neural network.

In at least an exemplary embodiment of the system, the pixel-wise feature map is generated via a neural network.

In at least an exemplary embodiment of the system, wherein the least one predefined calibration parameter includes an angle difference and a separation distance between the LiDAR and the camera on a vehicle.

In at least an exemplary embodiment of the system, the processor is further configured to determine, in the pixel-wise feature map, a pixel corresponding to each of the point data of the 2D coordinates, sample, in the pixel-wise feature map, pixels in an area of a predetermined size including the pixel corresponding to each of the point data, and generate a pixel feature vector representative of the sampled pixels through max pooling.

In at least an exemplary embodiment of the system, the processor is configured to generate a fused feature vector via a convolutional layer, after combining a voxel feature vector of the point data and the pixel feature vector.

In at least an exemplary embodiment of the system, the processor is further configured to extract the voxel feature vector of the point data by randomly selecting point data included in voxels of the voxel-wise feature map.

In at least an exemplary embodiment of the system, the processor is configured to apply a convolution operation to the voxel feature vector of the point data and the fused feature vector, apply a batch normalization operation to a result of the convolution operation, and apply a rectified linear unit (ReLU) operation to a result of the batch normalization operation to generate the fused feature vector.

In at least an exemplary embodiment of the system, the processor is further configured to update and output the voxel-wise feature map based on the fused data.

A vehicle, according to an exemplary embodiment of the present disclosure, includes a LiDAR and camera data fusion system, wherein the system includes an interface configured to receive point cloud data from a LiDAR sensor and image data from a camera, a memory configured to store at least one predefined calibration parameter, and a processor electrically or communicatively connected to the interface and the memory, and wherein the processor is configured to generate a voxel-wise feature map based on the point cloud data, generate a pixel-wise feature map based on the image data, convert three-dimensional (3D) coordinates of point data of the voxel-wise feature map to two-dimensional (2D) coordinates, based on the at least one predefined calibration parameter, and generate fused data by fusing pixel data of the pixel-wise feature map and the point data of the 2D coordinates.

The LiDAR and camera data fusion method and system according to the exemplary embodiments of the present disclosure may semantically segment a point cloud representing an object around a vehicle by solving a conventional difficulty in data matching when fusing data from a LiDAR and a camera of the vehicle via a middle-level feature fusion structure-based network.

The LiDAR and camera data fusion method and system according to the exemplary embodiments of the present disclosure may accurately match features extracted from a LiDAR and a camera of a vehicle.

The methods and apparatuses of the present disclosure have other features and advantages which will be apparent from or are set forth in more detail in the accompanying drawings, which are incorporated herein, and the following Detailed Description, which together serve to explain certain principles of the present disclosure.

It may be understood that the appended drawings are not necessarily to scale, presenting a somewhat simplified representation of various features illustrative of the basic principles of the present disclosure. The specific design features of the present disclosure as included herein, including, for example, specific dimensions, orientations, locations, and shapes will be determined in part by the particularly intended application and use environment.

In the figures, reference numbers refer to a same or equivalent parts of the present disclosure throughout the several figures of the drawing.

DETAILED DESCRIPTION

Reference will now be made in detail to various embodiments of the present disclosure(s), examples of which are illustrated in the accompanying drawings and described below. While the present disclosure(s) will be described in conjunction with exemplary embodiments of the present disclosure, it will be understood that the present description is not intended to limit the present disclosure(s) to those exemplary embodiments of the present disclosure. On the other hand, the present disclosure(s) is/are intended to cover not only the exemplary embodiments of the present disclosure, but also various alternatives, modifications, equivalents and other embodiments, which may be included within the spirit and scope of the present disclosure as defined by the appended claims.

Throughout the present specification, like reference numerals refer to like elements. The specification does not describe all elements of embodiments of the present disclosure, and general or overlapping content between the exemplary embodiments in the field of the present disclosure to which the present disclosure pertains will be omitted. Terms such as, "unit," "module," or "device" used herein may be implemented in software or hardware, and according to various exemplary embodiments of the present disclosure, a plurality of "units," "modules," or "devices" may be implemented as a single component or a single "unit," "module," or "device" may include a plurality of components.

Throughout the specification, when an element is referred to as being "coupled" or "connected" to another element, the element may be directly coupled or connected to the other element. It should be understood, however, that another element may be present therebetween.

Furthermore, it should be understood herein that a term such as "include" or "have" is intended to designate that the features, numbers, steps, operations, elements, parts, or combinations thereof described in the specification are present, and does not preclude the possibility of addition or presence of one or more other features, numbers, steps, operations, elements, parts, or combinations thereof.

Although terms including ordinal numbers, such as "first," "second," etc., may be used herein to describe various elements, the elements are not limited by these terms. These terms are generally used to distinguish one element from another.

The singular forms "a," "an," and "the" are intended to include the plural forms as well, unless the context clearly indicates otherwise.

Throughout the specification, identification numbers or reference numerals are used for the convenience of description and provided to describe the order of each step or operation, but each step or operation may also be performed in different orders unless a specific order is clearly described in context.

Embodiments of the present disclosure are intended to provide a technology for semantically segmenting point data of an object around a vehicle by fusing image data of a camera and point cloud data of a LiDAR via a middle-level feature fusion-based network, to which a three-dimensional (3D) network is applied as a point cloud backbone network, unlike the related art, providing a technology for fusing the image data and the point cloud data.

Hereinafter, the operational principles and embodiments of the present disclosure will be described with reference to the accompanying drawings.

Figure 2:
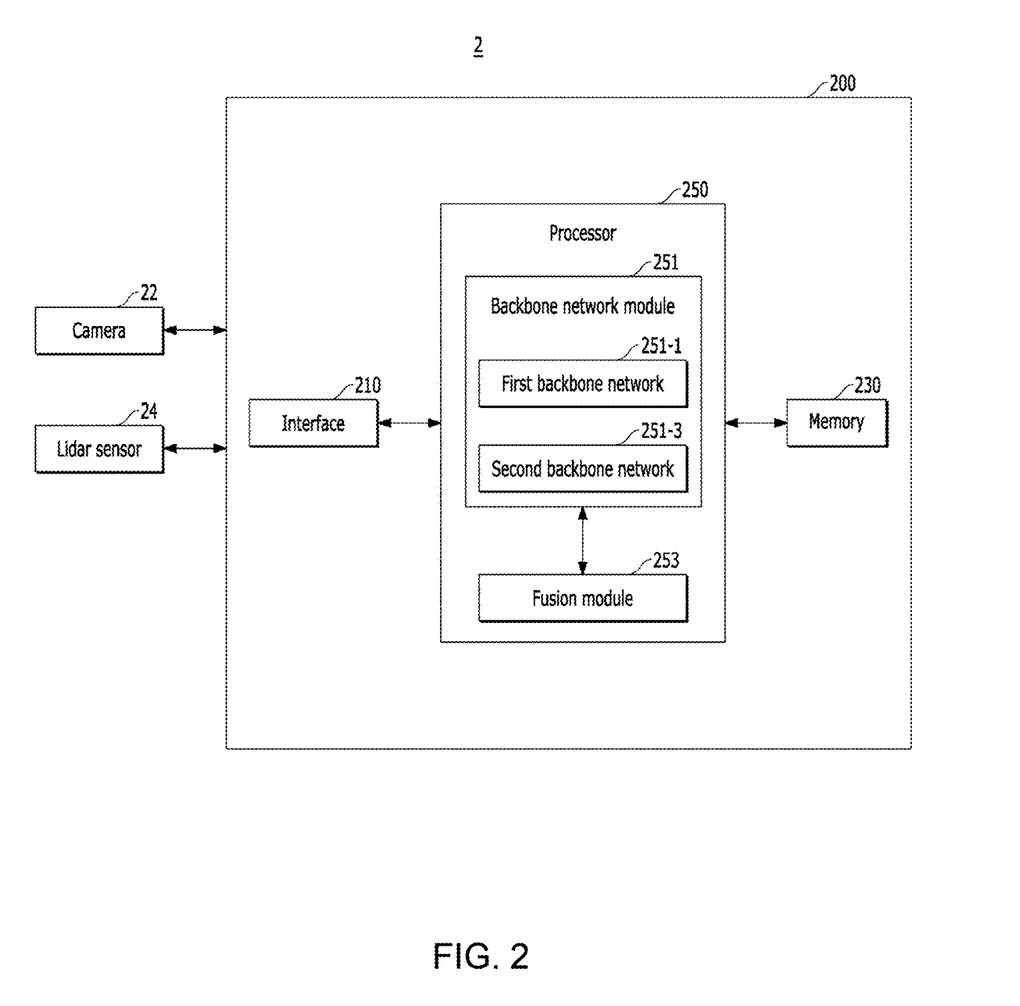
FIG. 2 is a block diagram illustrating a data fusion system of a vehicle according to an exemplary embodiment of the present disclosure.
Figure 3:
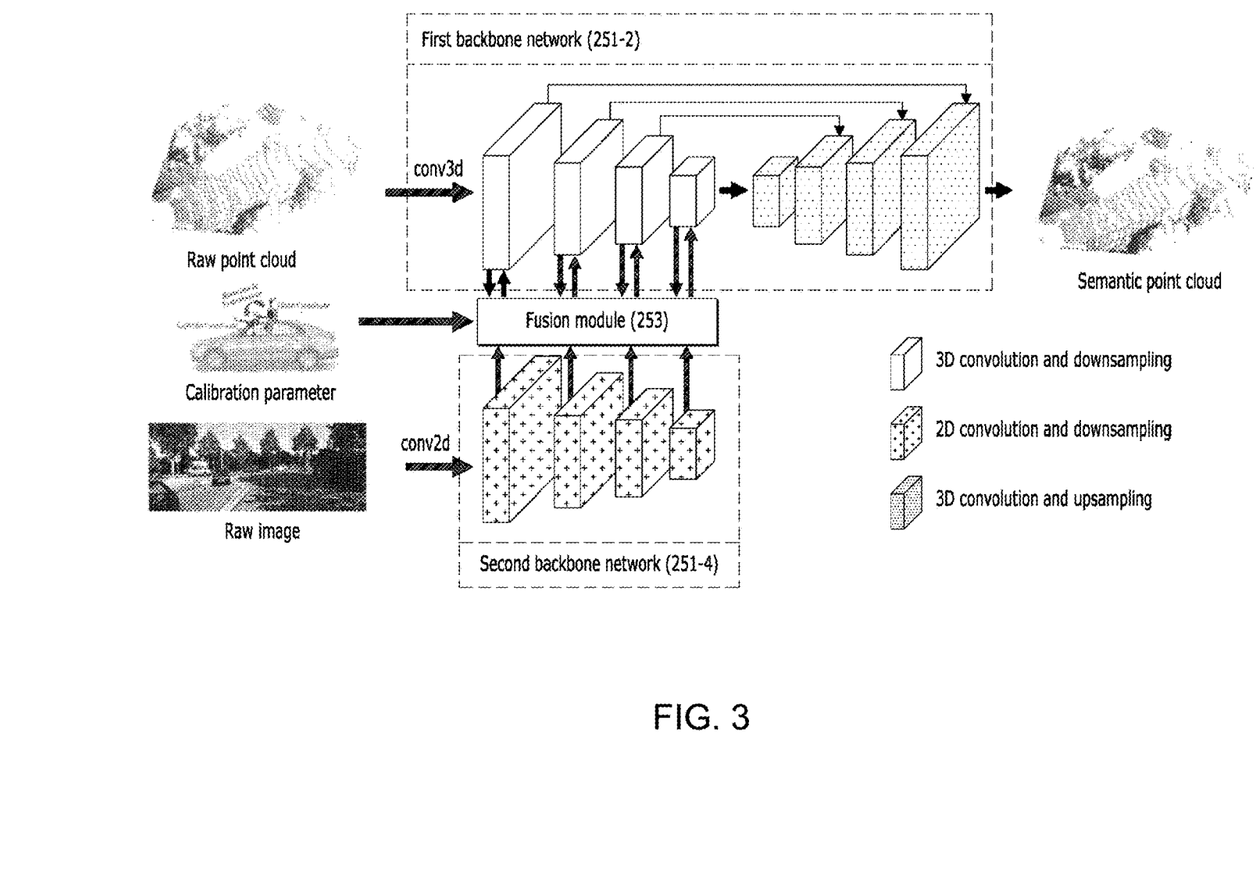
FIG. 3 and FIG. 4 are diagrams illustrating operations of a data fusion system according to an exemplary embodiment of the present disclosure.
Figure 4:
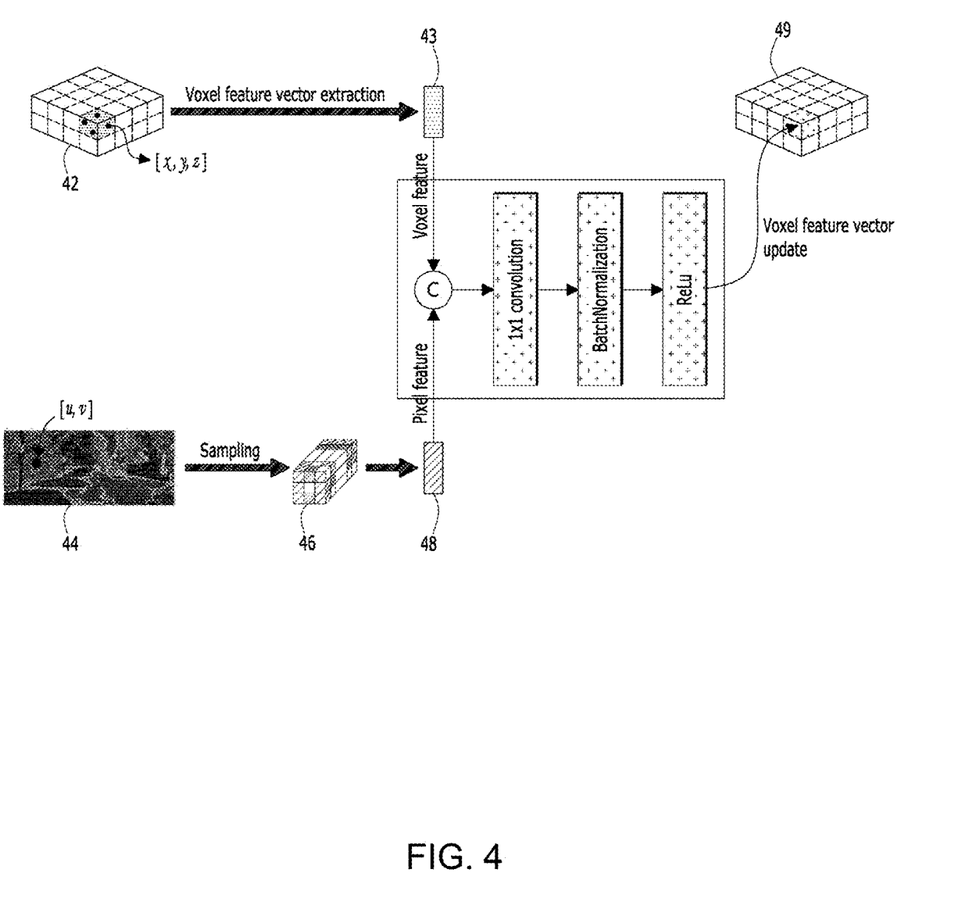

FIG. 2 is a block diagram illustrating a data fusion system of a vehicle according to an exemplary embodiment of the present disclosure. FIG. 3 and FIG. 4 are diagrams illustrating operations of a data fusion system according to an exemplary embodiment of the present disclosure.

Referring to FIG. 2, a vehicle 2 may include a camera 22, a LiDAR sensor (hereinafter simply referred to as 'a LiDAR') 24, and/or a data fusion system 200.

The camera 22, which may be provided as a single camera or a plurality of cameras, may be provided in the vehicle 2 to obtain image data of the surroundings of the vehicle 2.

The LiDAR 24, which may be provided as a single LiDAR or a plurality of LiDARs, may be provided in the vehicle 2 to generate LiDAR data, that is, point cloud data, by emitting laser pulses toward the surroundings of the vehicle 2.

The data fusion system 200 may include an interface 210, a memory 230, and/or a processor 250.

The interface 210 may transfer commands or data input from another device (e.g., the camera 22 and/or the LiDAR 24) or a user of the vehicle 2 to another component (e.g., the memory 230 and/or the processor 250) of the data fusion system 200, or output commands or data received from the other component of the data fusion system 200 to the other device of the vehicle 2.

The interface 210 may include a communication module to communicate with another device of the vehicle 2.

For example, the communication module may include a communication module configured to enable communication between devices of the vehicle 2 over a vehicle communication network, for example, Controller Area Network (CAN) communication and/or Local Interconnect Network (LIN) communication. The communication module may also include a wired communication module (e.g., a power line communication module) and/or a wireless communication module (e.g., a cellular communication module, a Wi-Fi communication module, a short-range wireless communication module, or a global navigation satellite system (GNSS) communication module).

The memory 230 may store various data used by at least one component of the data fusion system 200, such as, for example, input data and/or output data for software programs and commands related thereto.

The memory 230 may store a predefined calibration parameter.

The calibration parameter may include an angle difference (also referred to as a "rotation") between the camera 22 and the LiDAR 24 in the vehicle 2 and a separation distance (also referred to as a "translation") between the camera 22 and the LiDAR 24 in the vehicle 2.

The memory 230 may include a non-volatile memory such as, for example, cache, read-only memory (ROM), programmable ROM (PROM), an erasable programmable ROM (EPROM), an electrically erasable programmable ROM (EEPROM), and/or flash memory, and/or a volatile memory, such as, for example, random-access memory (RAM).

The processor 250 (also referred to as a control circuit or control unit) may be configured for controlling at least one other component of the data fusion system 200 (e.g., a hardware component (e.g., the interface 210 and/or the memory 230) and/or a software component (e.g., a software program), and may perform various data processing and computations.

Herein, in an exemplary embodiment of the present disclosure, the memory and the processor may be implemented as separate semiconductor circuits. Alternatively, the memory and the processor may be implemented as a single integrated semiconductor circuit. The processor may embody one or more processor(s).

The processor 250 may fuse the image data received from the camera 22 and the point cloud data received from the LiDAR 24, via a middle-level feature fusion-based network, to semantically segment the point cloud data of an object around the vehicle 2.

When fusing the image data from the camera 22 and the point cloud data from the LiDAR 24, the processor 250 may match pixels of the image data and voxels of the point cloud data, regardless of the reduced size of a feature map. Based on the matching of the pixels of the image data and the voxels of the point cloud data, the processor 250 may fuse data of corresponding areas and output fused data.

The fused data may be used for recognizing objects around the vehicle 2, through semantic segmentation processing.

For example, the processor 250 may recognize objects around the vehicle 2 by processing the fused data through semantic segmentation and predicting a class to which each point in the fused data belongs.

The processor 250 may include a backbone network module 251 and/or a fusion module 253.

The backbone network module 251 may include a backbone network configured to extract features of each sensor data.

For example, the backbone network module 251 may include a first backbone network 251-1 and a second backbone network 251-3.

The first backbone network 251-1, which may be a 3D voxel-based semantic segmentation network (also referred to herein as a "3D voxel-based neural network"), may extract features of the point cloud data received from the LiDAR 24.

The first backbone network 251-1 may include, for example, a 3D convolutional neural network (3D CNN), PCSCNet (fast 3D semantic segmentation of LiDAR point cloud for autonomous car using point convolution and sparse convolution network), or SEGCloud (semantic segmentation of 3D point clouds), and various other 3D voxel-based semantic segmentation networks may also be applied.

The second backbone network 251-3, which may be a neural network, may extract features of the image data received from the camera 22.

The second backbone network 251-3 may include, for example, a two-dimensional (2D) CNN, ResNet (deep residual learning for image recognition), or DeepLab (semantic image segmentation with deep convolutional nets), and various other networks may also be applied without limitation.

The backbone network module 251 may be configured to generate a voxel-wise feature map based on the point cloud data received from the LiDAR 24.

For example, the backbone network module 251 may voxelize point cloud data and then extract voxel-wise features via a first backbone network 251-2 to generate a voxel-wise feature map.

Referring to FIG. 3, the backbone network module 251 may input 3D data (conv3d) in which point cloud data of a raw point cloud obtained via the LiDAR 24 is voxelized as input data of the first backbone network 251-2.

Accordingly, the first backbone network 251-2 may iteratively perform convolution and downsampling a predetermined number of times to extract a feature map of the 3D data (conv3d).

The backbone network module 251 may be configured to generate a pixel-wise feature map based on the image data received from the camera 22.

For example, the backbone network module 251 may be configured to generate a pixel-wise feature map by extracting pixel-wise features from image data via a second backbone network 251-4.

Referring to FIG. 3, the backbone network module 251 may input 2D image data (conv2d) of a raw image obtained via the camera 22 as input data of the second backbone network 251-4.

Accordingly, the second backbone network 251-4 may iteratively perform convolution and downsampling a predetermined number of times to extract a feature map of the 2D image data (conv2d).

The fusion module 253 may fuse the 3D voxel-wise feature map and the 2D pixel-wise feature map, and update the voxel-wise feature map based on the fused data.

To fuse the 3D voxel-wise feature map and the 2D pixel-wise feature map, it is necessary to accurately match (or make correspond to) voxels in the voxel-wise feature map and pixels of the pixel-wise feature map.

Accordingly, referring to FIG. 3, the fusion module 253 may apply, to the voxel and pixel matching, the predefined calibration parameter representing an angle difference and/or separation distance relationship (or a translation and/or conversion relationship) between the camera 22 and the LiDAR 24 in the vehicle 2.

For example, the fusion module 253 may be configured to generate the fused data by fusing matched voxel and pixel pairs obtained based on the calibration parameter, via a convolutional layer.

Referring to FIG. 4, the fusion module 253 may randomly select arbitrary point data in each voxel included in a voxel-wise feature map 42. Furthermore, the fusion module 253 may extract a voxel feature vector 43 of the point data selected from the voxel-wise feature map 42 and identify a 3D coordinate value (x, y, z) of the selected point data.

Furthermore, based on the calibration parameter, the fusion module 253 may convert a coordinate system of the selected point data from 3D to 2D, that is, convert coordinates of the selected point data from 3D to 2D, using Equation 1 below.

$$[u, v] = P_{rec} \times \begin{bmatrix} R_{LiDAR}^{cam} & T_{LiDAR}^{cam} \\ 0 & 1 \end{bmatrix} \times [x, y, z] \quad \text{Equation 1}$$

wherein $P_{rec}$ denotes a projection matrix for changing a 3D coordinate system to a 2D coordinate system, $R_{LiDAR}^{cam}$ denotes an angle difference between the camera 22 and the LiDAR 24 in the vehicle 2, $T_{LiDAR}^{cam}$ denotes a separation distance between the camera 22 and the LiDAR 24 in the vehicle 2, [x,y,z] denotes a 3D coordinate value of point data, [u, v] denotes a 2D coordinate value of the point data.

Furthermore, the fusion module 253 may be configured to determine or identify, in a pixel-wise feature map 44, a pixel corresponding to each of the point data of which the coordinates are converted to 2D. For example, the fusion module 253 may identify, in the pixel-wise feature map 44, pixels of coordinates corresponding to coordinates of the point data of which the coordinates are converted to 2D.

Furthermore, the fusion module 253 may be configured to generate sampled pixels 46 by sampling pixels in an area of a predetermined size including the pixels identified in the pixel-wise feature map 44. The area of the predetermined size may be a 3×3 area, for example.

Furthermore, the fusion module 253 may be configured to generate a pixel feature vector 48 which is representative of the sampled pixels 46 from the sampled pixels 46 through max pooling.

Furthermore, the fusion module 253 may be configured to generate a fused feature vector by performing feature fusion after combining the voxel feature vector 43 and the pixel feature vector 48.

For example, the fusion module 253 may concatenate (indicated as C) the voxel feature vector 43 and the pixel feature vector 48, and then sequentially apply a convolution operation, a batch normalization operation, and a rectified linear unit (ReLU) operation to generate the fused feature vector.

Furthermore, the backbone network module 251 may update the existing voxel feature vector 43 to the fused feature vector which is fused by the fusion module 253 to output an updated feature map 49.

Referring back to FIG. 3, the backbone network module 251 may be configured to generate and output semantic point cloud data based on the updated feature map 49.

For example, the backbone network module 251 may iteratively perform convolution and upsampling a predetermined number of times to increase the size of the updated feature map 49 by a predetermined size, generating the semantic point cloud data for semantic segmentation processing.

The fusion module 253 may also be referred to herein as a voxel and pixel matching-based feature map fusion module.

Figure 5:
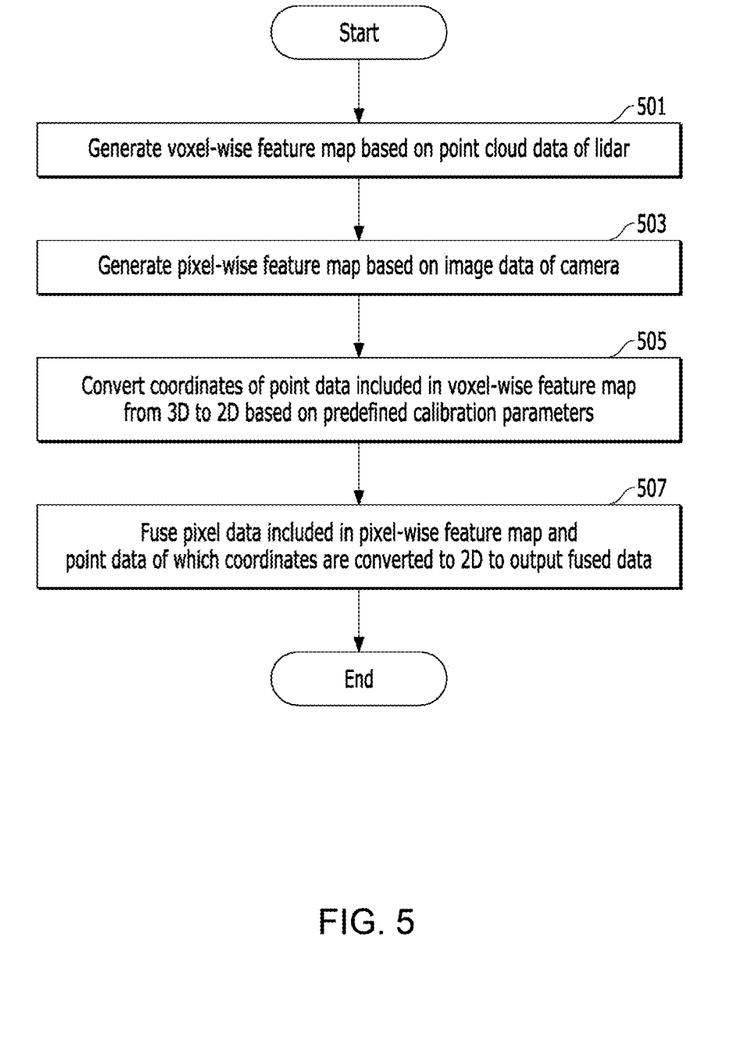
FIG. 5 is a flowchart illustrating operations of a data fusion system according to an exemplary embodiment of the present disclosure.

FIG. 5 is a flowchart illustrating operations of the data fusion system 200 (and/or the processor 250) according to an exemplary embodiment of the present disclosure.

Referring to FIG. 5, in operation 501, the data fusion system 200 may be configured to generate a voxel-wise feature map based on point cloud data of the LiDAR 24.

The data fusion system 200 may input the point cloud data as input data of the first backbone network 251-1, and the first backbone network 251-1 may be configured to generate the voxel-wise feature map based on the input of the point cloud data.

In operation 503, the data fusion system 200 may be configured to generate a pixel-wise feature map based on image data of the camera 22.

The data fusion system 200 may input the image data as input data of the second backbone network 251-3, and the second backbone network 251-3 may output the pixel-wise feature map based on the input of the image data.

In operation 505, the data fusion system 200 may convert coordinates of the point data included in the voxel-wise feature map from 3D to 2D based on a predefined calibration parameter.

The predefined calibration parameter may be a parameter for matching, based on the fact that a coordinate system of the voxel-wise feature map is 3D and a coordinate system of the pixel-wise feature map is 2D, each coordinate of the 3D coordinate system of the voxel-wise feature map and each coordinate of the 2D coordinate system of the pixel-wise feature map.

For example, the predefined calibration parameter may include an angle difference and a separation distance between the camera 22 and the LiDAR 24 in the vehicle 2.

For example, the data fusion system 200 may convert coordinates of the point data included in the voxel-wise feature map from 3D to 2D, based on the predefined calibration parameter, using Equation 1 described above.

In operation 507, the data fusion system 200 may fuse pixel data included in the pixel-wise feature map and point data of which the coordinates are converted to 2D to output fused data.

For example, the data fusion system 200 may randomly select point data in each voxel included in the voxel-wise feature map and extract a voxel feature vector of the point data.

Furthermore, the data fusion system 200 may identify a pixel corresponding to the point data of which the coordinates are converted to a 2D circle in the pixel-wise feature map, and sample pixels in an area of a predetermined size including the identified pixel.

Furthermore, the data fusion system 200 may be configured to generate a pixel feature vector representative of the sampled pixels from the sampled pixels through max pooling.

Furthermore, the data fusion system 200 may combine a voxel feature vector of point data selected in each voxel included in the voxel-wise feature map with a corresponding pixel feature vector, and may then generate a fused feature vector, that is, fused data, via a convolutional layer.

For example, the data fusion system 200 may be configured to generate the fused data by sequentially applying a convolution operation, a batch normalization operation, and a ReLU operation to the voxel feature vector of the point data selected in each voxel included in the voxel-wise feature map and the fused feature vector corresponding to the voxel feature vector in the fused data.

In addition to the foregoing embodiment of FIG. 5, the voxel-wise feature map may be updated and output, based on the fused data. For example, the existing voxel-wise feature map may be replaced with the fused data and may then be output for semantic segmentation processing.

Figure 6:
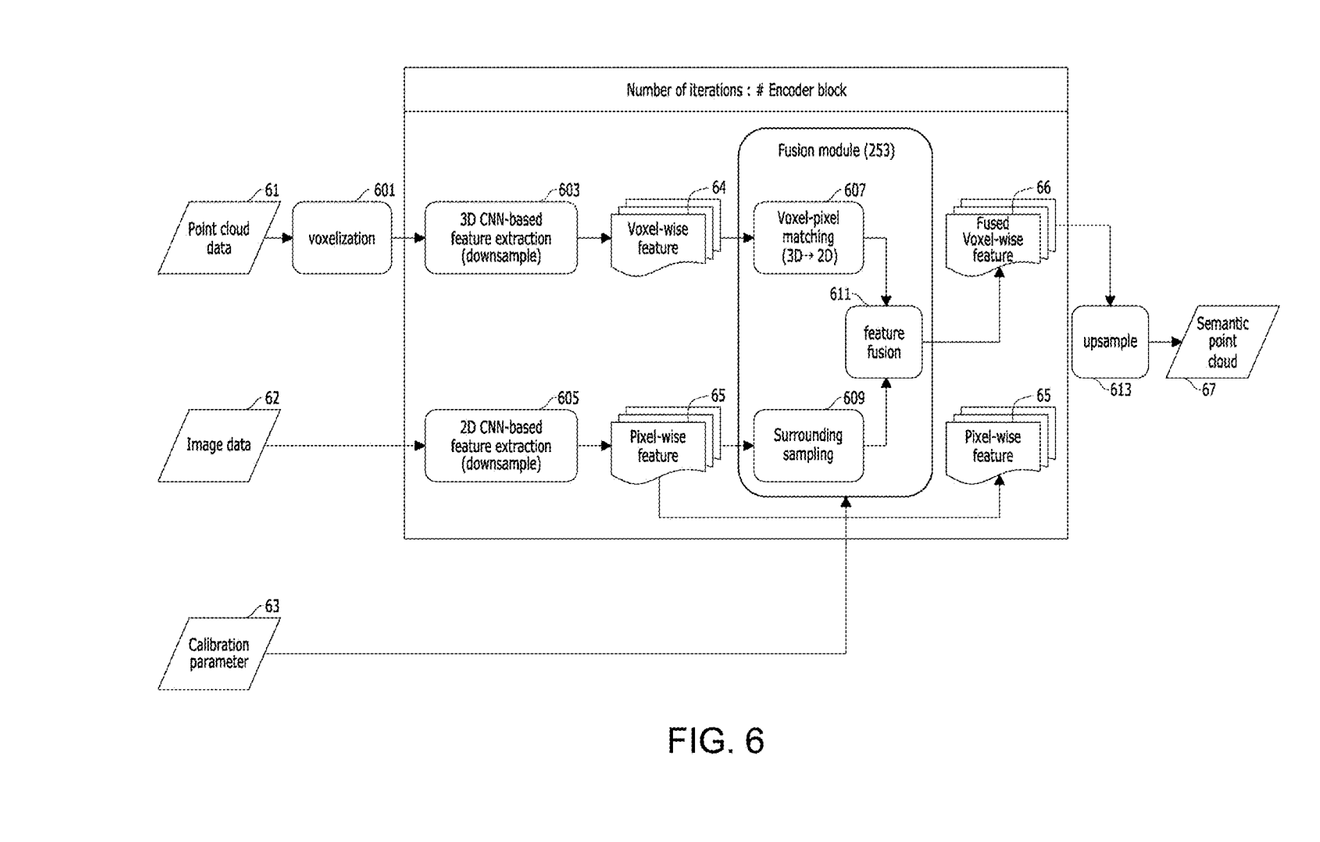
FIG. 6 is a diagram illustrating operations of a data fusion system according to an exemplary embodiment of the present disclosure.

FIG. 6 is a diagram illustrating operations of the data fusion system 200 (and/or the processor 250) according to an exemplary embodiment of the present disclosure.

Referring to FIG. 6, the data fusion system 200 may voxelize point cloud data (also referred to herein as 3D point cloud data) 61 in operation 601.

For example, the point cloud data to be voxelized may be point cloud data included in a field of view (FOV) of the camera 22 which is included in point cloud data received from the LiDAR 24.

The data fusion system 200 may input resultant data obtained by the voxelization of the point cloud data 61 to a 3D CNN, and the 3D CNN may then perform 3D CNN-based feature extraction (downsampling) in operation 603 to output a plurality of voxel-wise features 64.

The data fusion system 200 may input received image data 62 to a 2D CNN, and the 2D CNN may then perform 2D CNN-based feature extraction (downsampling) in operation 605 to output a plurality of pixel-wise features 65.

The fusion module 253 of the data fusion system 200 may match a plurality of voxel features and a plurality of pixel features, that is, convert a 3D voxel-wise feature map including the plurality of voxel features into a 2D form (i.e., voxel-pixel matching (3D →2D)) in operation 607.

The fusion module 253 of the data fusion system 200 may perform sampling (e.g., surrounding sampling) on the plurality of pixel-wise features in operation 609.

The fusion module 253 of the data fusion system 200 may fuse feature data resulting from operation 607 and feature data resulting from operation 609 in operation 611 to output fused data, i.e., a fused voxel-wise feature 66.

The data fusion system 200 may upsample the fused data 66 in operation 613 to output a semantic point cloud 67 which is data resulting from the upsampling.

For example, the semantic point cloud 67 may also be referred to as a semantically segmented point cloud, which may be used for object recognition for controlling the driving of the vehicle 2 through semantic segmentation processing (or predicting a class to which each point belongs).

Figure 7:
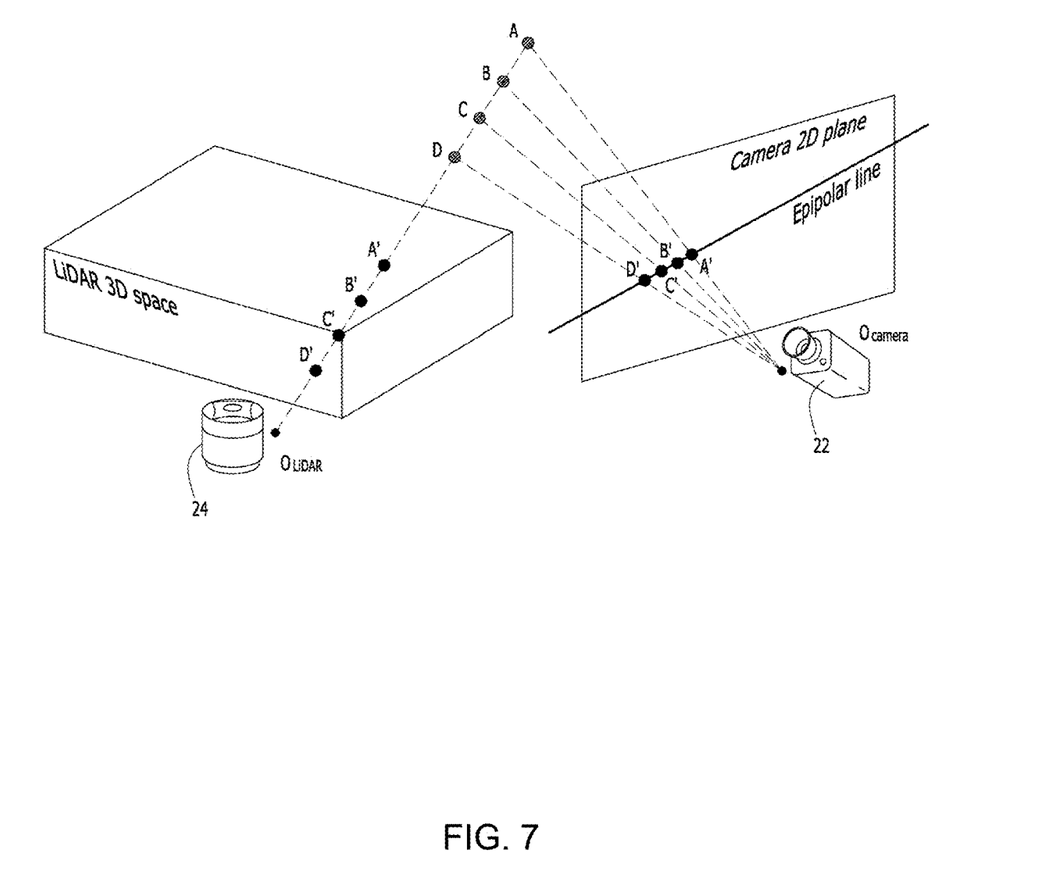
FIG. 7 is a diagram illustrating a result of matching point cloud data and image data according to an exemplary embodiment of the present disclosure.

FIG. 7 is a diagram illustrating a result of matching point cloud data and image data according to an exemplary embodiment of the present disclosure.

Referring to FIG. 7, unlike the related art, the exemplary embodiments of the present disclosure may accurately match features extracted from data of the camera 22 and the LiDAR 24.

When points of different objects (A, B, C, and D) are projected onto a 3D plane of the LiDAR 24 and a 2D plane of the camera 22, each of the objects (A, B, C, and D) may correspond to one to one (1:1, or point:point) in the respective planes of the LiDAR 24 and the camera 22.

For example, referring to FIG. 7, when the point of A is A', the point of B is B', the point of C is C', and the point of D is D', A' projected onto the 3D plane of the LiDAR 24 may correspond to A' projected onto the 2D plane of the camera 22, B' projected onto the 3D plane of the LiDAR 24 may correspond to B' projected onto the 2D plane of the camera 22, C' projected onto the 3D plane of the LiDAR 24 may correspond to C' projected onto the 2D plane of the camera 22, and D' projected onto the 3D plane of the LiDAR 24 may correspond to D' projected onto the 2D plane of the camera 22.

Accordingly, it may be verified that the voxel and pixel matching-based fusion described herein may improve the performance of semantic segmentation of a point cloud, compared to the related art.

Figure 8A:
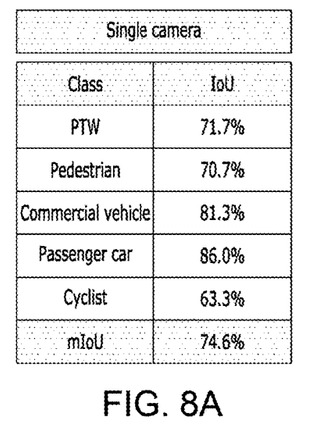
FIGS. 8A, 8B and 8C are diagrams illustrating a result of comparing performance exhibited when applying a single LiDAR and when applying a camera and a LiDAR according to an exemplary embodiment of the present disclosure.
Figure 8B:
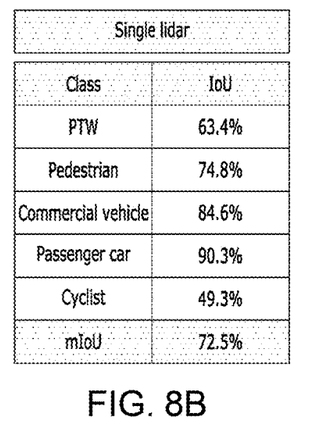
Figure 8C:
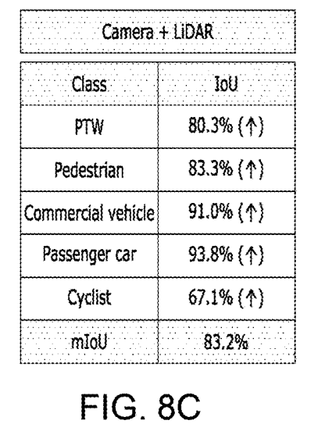

FIG. 8 is a diagram illustrating a result of comparing performance exhibited when applying a single LiDAR and when applying a camera and a LiDAR according to an exemplary embodiment of the present disclosure.

FIG. 8A shows intersection over union (IoU) and mean intersection over union (mIoU) values for each class, determined based on data obtained via a single camera.

FIG. 8B shows IoU and mIoU values for each class, determined based on data obtained via a single LiDAR.

FIG. 8C shows IoU and mIoU values for each class, determined based on data obtained via a camera and a LiDAR according to an exemplary embodiment of the present disclosure.

Referring to FIG. 8A, FIG. 8B and FIG. 8C, it may be verified that a mIoU obtained when fusing data of the camera and the LiDAR is 83.2%, which indicates a higher performance than the performance exhibited using the single sensor. It may be verified that the performance of the exemplary embodiments of the present disclosure shows an 8.6% improvement in mIoU over the single camera and a 10.7% improvement in mIoU over the single LiDAR.

It may be verified that an IoU of a class of an object of a relatively small size, for example, a PTW, a pedestrian, and a cyclist, is greatly higher than that obtained when using the single camera or the single LiDAR.

The exemplary embodiments of the present disclosure described above may be implemented in a form of a recording medium storing instructions executable by a computer. The instructions may be stored in a form of program code, which, when executed by a processor, may be configured to generate program modules to perform the operations of the exemplary embodiments of the present disclosure. The recording medium may be implemented as a computer-readable medium.

The computer-readable medium includes all types of recording devices in which data readable by a computer system is stored. The computer-readable medium includes, as non-limiting examples, read-only memory (ROM), random-access memory (RAM), magnetic tape, magnetic disk, flash memory, optical data storage, and the like.

For convenience in explanation and accurate definition in the appended claims, the terms "upper", "lower", "inner", "outer", "up", "down", "upwards", "downwards", "front", "rear", "back", "inside", "outside", "inwardly", "outwardly", "interior", "exterior", "internal", "external", "forwards", and "backwards" are used to describe features of the exemplary embodiments with reference to the positions of such features as displayed in the figures. It will be further understood that the term "connect" or its derivatives refer both to direct and indirect connection.

The term "and/or" may include a combination of a plurality of related listed items or any of a plurality of related listed items. For example, "A and/or B" includes all three cases such as "A", "B", and "A and B".

In the present specification, unless stated otherwise, a singular expression includes a plural expression unless the context clearly indicates otherwise.

In exemplary embodiments of the present disclosure, "at least one of A and B" may refer to "at least one of A or B" or "at least one of combinations of one or more of A and B". In addition, "one or more of A and B" may refer to "one or more of A or B" or "one or more of combinations of one or more of A and B".

In the exemplary embodiment of the present disclosure, it should be understood that a term such as "include" or "have" is directed to designate that the features, numbers, steps, operations, elements, parts, or combinations thereof described in the specification are present, and does not preclude the possibility of addition or presence of one or more other features, numbers, steps, operations, elements, parts, or combinations thereof.

The foregoing descriptions of specific exemplary embodiments of the present disclosure have been presented for purposes of illustration and description. They are not intended to be exhaustive or to limit the present disclosure to the precise forms disclosed, and obviously many modifications and variations are possible in light of the above teachings. The exemplary embodiments were chosen and described in order to explain certain principles of the invention and their practical application, to enable others skilled in the art to make and utilize various exemplary embodiments of the present disclosure, as well as various alternatives and modifications thereof. It is intended that the scope of the present disclosure be defined by the Claims appended hereto and their equivalents.

What is claimed is:

1. A Light Detection and Ranging (LiDAR) and camera data fusion method, comprising:
   generating, by a processor, a voxel-wise feature map based on point cloud data of a LiDAR sensor;
   generating, by the processor, a pixel-wise feature map based on image data of a camera;
   converting, by the processor, three-dimensional (3D) coordinates of point data of the voxel-wise feature map to two-dimensional (2D) coordinates, based on at least one predefined calibration parameter; and
   generating, by the processor, fused data by combining pixel data of the pixel-wise feature map and point data of the 2D coordinates.

2. The LiDAR and camera data fusion method of claim 1, wherein the voxel-wise feature map is generated via a 3D voxel-based neural network.

3. The LiDAR and camera data fusion method of claim 1, wherein the pixel-wise feature map is generated via a neural network.

4. The LiDAR and camera data fusion method of claim 1, wherein the at least one predefined calibration parameter includes an angle difference and a separation distance between the LiDAR and the camera on a vehicle.

5. The LiDAR and camera data fusion method of claim 1, further including:
   determining, by the processor, on the pixel-wise feature map, a pixel corresponding to each of the point data of the 2D coordinates;
   sampling, by the processor, in the pixel-wise feature map, pixels in an area of a predetermined size including the pixel corresponding to each of the point data; and
   generating, by the processor, a pixel feature vector representative of the sampled pixels through max pooling.

6. The LiDAR and camera data fusion method of claim 5, wherein the generating of fused data includes generating a fused feature vector via a convolutional layer, after combining a voxel feature vector of the point data and the pixel feature vector.

7. The LiDAR and camera data fusion method of claim 6, further including:
extracting, by the processor, the voxel feature vector of the point data by randomly selecting the point data included in voxels of the voxel-wise feature map.

8. The LiDAR and camera data fusion method of claim 6, wherein the generating of the fused feature vector via the convolutional layer includes:
applying a convolution operation to the voxel feature vector of the point data and the fused feature vector;
applying a batch normalization operation to a result of the convolution operation; and
applying a rectified linear unit (ReLU) operation to a result of the batch normalization operation to generate the fused feature vector.

9. The LiDAR and camera data fusion method of claim 1, further including updating and outputting the voxel-wise feature map based on the fused data.

10. A LiDAR and camera data fusion system, comprising:
an interface configured to receive point cloud data from a LiDAR sensor and image data from a camera;
a memory configured to store at least one predefined calibration parameter; and
a processor electrically or communicatively connected to the interface and the memory,
wherein the processor is configured to:
generate a voxel-wise feature map based on the point cloud data;
generate a pixel-wise feature map based on the image data;
convert three-dimensional (3D) coordinates of point data of the voxel-wise feature map to two-dimensional (2D) coordinates, based on the at least one predefined calibration parameter; and
generate fused data by fusing pixel data of the pixel-wise feature map and the point data of the 2D coordinates.

11. The LiDAR and camera data fusion system of claim 10, wherein the voxel-wise feature map is generated via a 3D voxel-based neural network.

12. The LiDAR and camera data fusion system of claim 10, wherein the pixel-wise feature map is generated via a neural network.

13. The LiDAR and camera data fusion system of claim 10, wherein the least one predefined calibration parameter includes an angle difference and a separation distance between the LiDAR and the camera on a vehicle.

14. The LiDAR and camera data fusion system of claim 10, wherein the processor is further configured to:
determine, in the pixel-wise feature map, a pixel corresponding to each of the point data of the 2D coordinates;
sample, in the pixel-wise feature map, pixels in an area of a predetermined size including the pixel corresponding to each of the point data; and
generate a pixel feature vector representative of the sampled pixels through max pooling.

15. The LiDAR and camera data fusion system of claim 14, wherein the processor is further configured to generate a fused feature vector via a convolutional layer, after combining a voxel feature vector of the point data and the pixel feature vector.

16. The LiDAR and camera data fusion system of claim 15, wherein the processor is further configured to extract the voxel feature vector of the point data by randomly selecting point data included in voxels of the voxel-wise feature map.

17. The LiDAR and camera data fusion system of claim 15, wherein the processor is further configured to:
apply a convolution operation to the voxel feature vector of the point data and the fused feature vector;
apply a batch normalization operation to a result of the convolution operation; and
apply a rectified linear unit (ReLU) operation to a result of the batch normalization operation to generate the fused feature vector.

18. The LiDAR and camera data fusion system of claim 10, wherein the processor is further configured to update and output the voxel-wise feature map based on the fused data.

19. A vehicle comprising:
a LiDAR and camera data fusion system,
wherein the system includes:
an interface configured to receive point cloud data from a LiDAR sensor and image data from a camera;
a memory configured to store at least one predefined calibration parameter; and
a processor electrically or communicatively connected to the interface and the memory, and
wherein the processor is configured to:
generate a voxel-wise feature map based on the point cloud data;
generate a pixel-wise feature map based on the image data;
convert three-dimensional (3D) coordinates of point data of the voxel-wise feature map to two-dimensional (2D) coordinates, based on the at least one predefined calibration parameter; and
generate fused data by fusing pixel data of the pixel-wise feature map and the point data of the 2D coordinates.

* * * * *